United States Patent
De Angelis et al.

(10) Patent No.: US 11,028,001 B2
(45) Date of Patent: Jun. 8, 2021

(54) HIGH TEMPERATURE GLASS MELTING VESSEL

(71) Applicant: Corning Incorporated, Corning, NY (US)

(72) Inventors: Gilbert De Angelis, Lindley, NY (US); Megan Aurora DeLamielleure, Corning, NY (US); Guido Peters, Bath, NY (US)

(73) Assignee: Corning Incorporated, Corning, NY (US)

( * ) Notice: Subject to any disclaimer, the term of this patent is extended or adjusted under 35 U.S.C. 154(b) by 96 days.

(21) Appl. No.: 16/348,142

(22) PCT Filed: Nov. 7, 2017

(86) PCT No.: PCT/US2017/060474
§ 371 (c)(1),
(2) Date: May 7, 2019

(87) PCT Pub. No.: WO2018/089387
PCT Pub. Date: May 17, 2018

(65) Prior Publication Data
US 2019/0276346 A1   Sep. 12, 2019

Related U.S. Application Data

(60) Provisional application No. 62/419,133, filed on Nov. 8, 2016.

(51) Int. Cl.
*C03B 5/027* (2006.01)
*C03B 5/03* (2006.01)
*C03B 5/43* (2006.01)

(52) U.S. Cl.
CPC . *C03B 5/03* (2013.01); *C03B 5/43* (2013.01)

(58) Field of Classification Search
CPC ......... C03B 5/02; C03B 5/027; C03B 5/0275; C03B 5/03; C03B 5/031; C03B 5/04;
(Continued)

(56) References Cited

U.S. PATENT DOCUMENTS 2,267,537 A * 12/1941 Romazzotti ............. C03B 5/027
373/30
2,523,030 A *  9/1950 Labino ...................... C03B 5/03
373/40

(Continued)

FOREIGN PATENT DOCUMENTS

| CN | 101408231 A | 4/2009 |
| CN | 101668875 A | 3/2010 |

(Continued)

OTHER PUBLICATIONS

International Search Report and Written Opinion of the International Searching Authority; PCT/US2017/060474; dated Jan. 26, 2018; 9 Pages; ISA/US Commissioner for Patents.

(Continued)

*Primary Examiner* — Hung D Nguyen

(57) ABSTRACT

A glass melt delivery system vessel has at least one sidewall and floor made of a refractory material, such as zirconia, and at least one electrode extending through the refractory material. The at least one electrode is configured to heat a glass melt in contact with the refractory material at an average temperature of at least about 1600 C° without exceeding a breakdown condition of the refractory material in contact with the glass melt.

24 Claims, 3 Drawing Sheets

(58) Field of Classification Search
CPC ......... C03B 5/16; C03B 5/167; C03B 5/1672;
C03B 5/1675; C03B 5/182; C03B 5/185;
C03B 5/20; C03B 5/205; C03B 5/225;
C03B 5/23; C03B 5/24; C03B 5/26;
C03B 5/425; C03B 5/43; C03B 5/44
USPC ......... 373/27, 29, 30, 36–41; 65/128, 135.4,
65/135.7, 135.9, 141, 339, 374.13
See application file for complete search history.

(56) References Cited

U.S. PATENT DOCUMENTS

| | | | |
|---|---|---|---|
| 3,530,221 | A | 9/1970 | Penberthy |
| 3,941,577 | A * | 3/1976 | Schwenninger .......... C03B 5/03 65/135.7 |
| 4,143,232 | A * | 3/1979 | Bansal .................... C03B 5/185 373/41 |
| 5,283,803 | A | 2/1994 | Kottnauer et al. |
| 7,655,587 | B2 | 2/2010 | Boussant-Roux et al. |
| 7,687,422 | B2 | 3/2010 | Boussant-Roux et al. |
| 8,341,978 | B2 | 1/2013 | Hofmann et al. |
| 8,869,564 | B2 | 10/2014 | Gross et al. |
| 2008/0057275 | A1 | 3/2008 | Grzesik et al. |
| 2008/0076659 | A1 | 3/2008 | Boussant-Roux et al. |
| 2010/0122555 | A1 | 5/2010 | Lineman et al. |
| 2014/0144183 | A1 * | 5/2014 | Demirbas ............... C04B 35/64 65/134.4 |
| 2014/0196504 | A1 * | 7/2014 | Cabodi .................... C03B 5/43 65/374.13 |

FOREIGN PATENT DOCUMENTS

| | | |
|---|---|---|
| CN | 102256906 A | 11/2011 |
| CN | 102807307 A | 12/2012 |
| CN | 204474521 U | 7/2015 |
| CN | 105776819 A | 7/2016 |
| GB | 1281424 A | 7/1972 |
| NO | 2014/036979 A1 | 3/2014 |

OTHER PUBLICATIONS

J. Stanek; "Electric Melting of Glass: Glass Science and Technology 1"; Elsevier Scientific Publishing Company, (1977) p. 358.
Pincus et al; "Electric Melting in the Glass Industry"; Ch. 8 Electrical Glass Melting, New York: Books for Industry and the Glass Industry Magazine, p. 27, (1966.
Chinese Patent Application No. 201780069113.9, Office Action dated Mar. 17, 2021, 13 pages (6 pages of English Translation and 7 pages of Original Document).

* cited by examiner

HIGH TEMPERATURE GLASS MELTING VESSEL

This application claims the benefit of priority under 35 U.S.C. § 371 of International Patent Application Serial No. PCT/US17/60474 filed on Nov. 7, 2017, which claims priority to U.S. Provisional Application Ser. No. 62/419,133, filed on Nov. 8, 2016, the contents of each are relied upon and incorporated herein by reference in their entireties.

FIELD

The present invention relates generally to a glass melt delivery system vessel and more particularly to a vessel for high temperature glass manufacturing.

BACKGROUND

Glass compositions for use, for example, in high resolution display applications, can have considerably high melting temperatures. Such compositions are often melted in a glass melt delivery system vessel, such as a melting vessel or furnace having a refractory material at an interface between the vessel wall and the glass melt. Power is provided to the melting vessel through use of electrodes and/or combustion of a combustible fluid.

High temperature glass melts are, however, corrosive to refractory materials and have a tendency to thin the refractory over time, which can, in turn, limit vessel life. In addition, corrosion of the refractory materials can cause undesirable defects in the final glass product, including defects caused by dissolution of the refractory material into the glass melt. Accordingly, corrosion resistance is an important property for a glass melt delivery system vessel refractory material.

Other important properties of glass melt delivery system vessel refractory materials include thermal shock resistance and electrical resistivity. In that regard, thermal shock resistance and electrical resistivity address the potential for the refractory material to fail and, depending on the severity of the failure, the useful life of the melting vessel may be compromised or the affected region of the refractory material may create solid defects.

For example, the electrical resistivity of the refractory material must be high enough that the majority of electrical conduction occurs in the glass melt rather than the refractory material. In general, this of less practical concern when the electrical resistivity of the glass melt is substantially lower than the electrical resistivity of the refractory. However, it can be of significant concern when the electrical resistivity of the glass melt is approximately equal to or higher than the electrical resistivity of the refractory. The relative difference between the resistivity of the glass melt and the refractory is not only composition dependent but also temperature dependent. For example, the refractory material is increasingly electrically conductive with increasing temperature, such that at the temperatures prevailing in high temperature glass melting operations, the electrical resistivity of the refractory material at the interface between the refractory material and a specific glass melt may be lower than that of the glass melt, whereas the electrical resistivity of the refractory may be higher than that of the same glass melt at lower temperatures.

The electrical resistivity of the refractory material relative to that of the glass melt affects the amount of power generated within the refractory material. The amount of power generated within the refractory material is also affected by other factors including the geometry of the refractory material, the path length between electrodes, and the voltage between electrodes. A breakdown condition can be described as a condition at which, in the refractory material, a higher amount of power is generated within the refractory material than can be dissipated through heat loss from the refractory material. Depending on the amount of heat transfer from the refractory material at the glass melt interface and the heat transfer from the hot refractory to the cold face of the refractory, this can, in turn, cause an undesirable run away condition where the temperature of the refractory material increases to its melting point. Once the melting point is exceeded, even after cooling the refractory, the resistivity of the refractory may be permanently lower, either by melting and re-cooling or by chemical mixing with other nearby refractories. This lower resistivity makes exceeding breakdown condition after recovery more likely. Ultimately, if the required glass melt temperatures cannot be maintained without exceeding the breakdown condition of the refractory, the production process must be shut down, incurring cost to rebuild the system and lost production time.

SUMMARY

Embodiments disclosed herein include a glass melt delivery system vessel. The glass melt delivery system vessel includes at least one sidewall and floor, wherein the at least one sidewall and floor include a refractory material. The glass melt delivery system vessel also includes at least one electrode extending through the refractory material. The at least one electrode is configured to heat a glass melt in contact with the refractory material at an average temperature of at least about 1600° C. without exceeding a breakdown condition of the refractory material in contact with the glass melt.

Embodiments disclosed herein also include a method of making a glass article. The method includes processing a glass composition in a glass melt delivery system vessel. The glass melt delivery system vessel includes at least one sidewall and floor, wherein the at least one sidewall and floor comprise a refractory material. The glass melt delivery system vessel also includes at least one electrode extending through the refractory material. The at least one electrode heats a glass melt in contact with the refractory material at an average temperature of at least about 1600° C. without exceeding a breakdown condition of the refractory material in contact with the glass melt.

Embodiments disclosed herein further include a glass article, such as a glass sheet, made by the above method as well as an electronic device comprising a glass sheet made by the above method.

Additional features and advantages of the embodiments disclosed herein will be set forth in the detailed description which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

DETAILED DESCRIPTION

Figure 1:
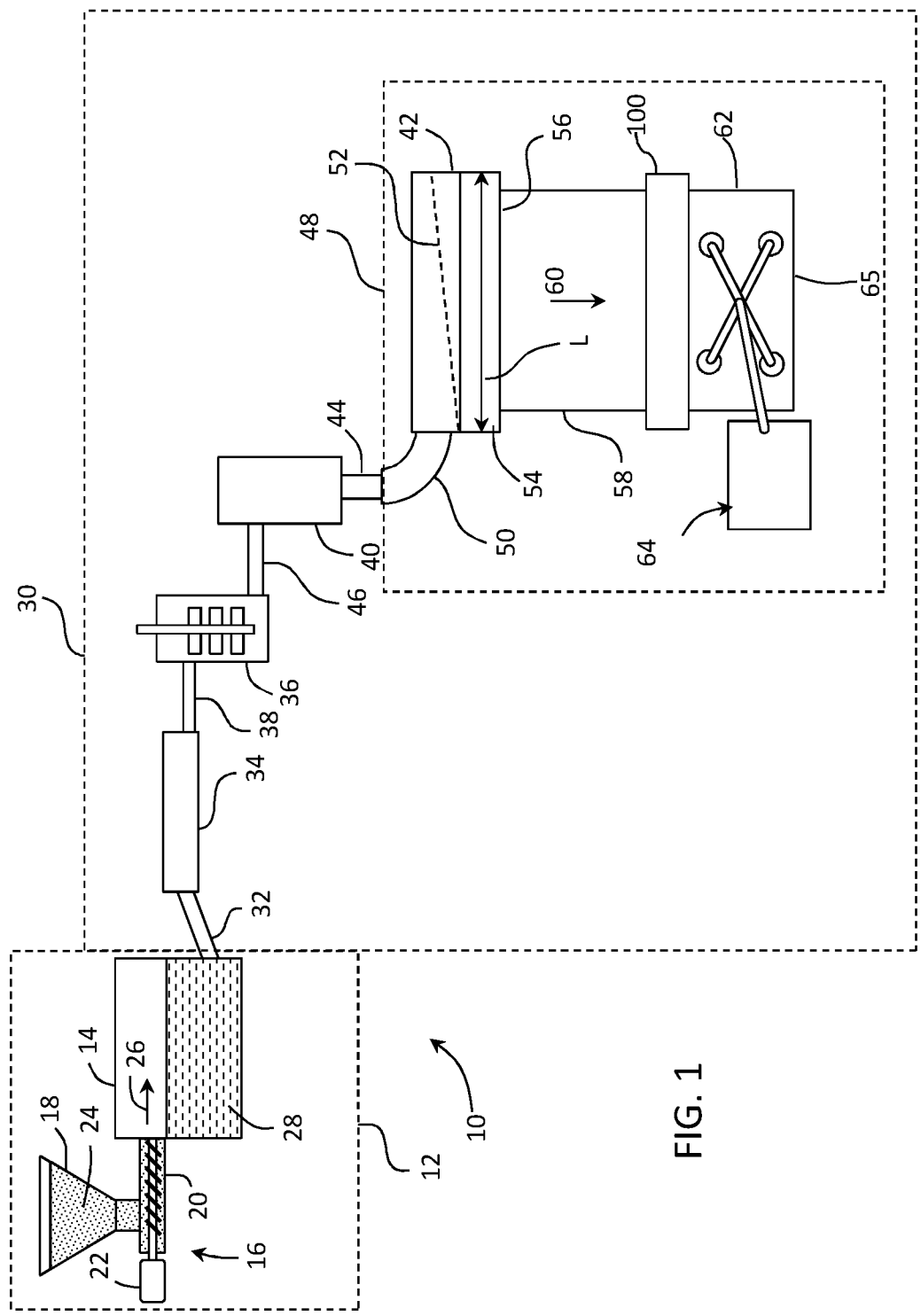
FIG. 1 is a schematic view of an example fusion down draw glass making process.

Reference will now be made in detail to the present preferred embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "glass melt delivery system vessel" includes any vessel used in a glass melt delivery system wherein electrical resistive heating is used to heat a glass composition and/or maintain the temperature of a glass composition above a predetermined temperature or within a predetermined temperature range. Examples of glass melt delivery system vessels include melting vessels, fining vessels, and connecting conduits as described herein.

As used herein, the term "breakdown condition of the refractory material" refers to a condition at which, in the refractory material, a higher amount of power is generated within the refractory material than can be dissipated through heat loss from the refractory material such that, over time, at least one mechanical property of the refractory material is adversely affected as a result of the breakdown condition of the refractory material being met.

Shown in FIG. 1 is an exemplary glass manufacturing apparatus 10. In some examples, the glass manufacturing apparatus 10 can comprise a glass melting furnace 12 that can include a melting vessel 14. In addition to melting vessel 14, glass melting furnace 12 can optionally include one or more additional components such as heating elements (e.g., combustion burners or electrodes) that heat raw materials and convert the raw materials into molten glass. In further examples, glass melting furnace 12 may include thermal management devices (e.g., insulation components) that reduce heat lost from a vicinity of the melting vessel. In still further examples, glass melting furnace 12 may include electronic devices and/or electromechanical devices that facilitate melting of the raw materials into a glass melt. Still further, glass melting furnace 12 may include support structures (e.g., support chassis, support member, etc.) or other components.

Glass melting vessel 14 is typically comprised of refractory material, such as a refractory ceramic material, for example a refractory ceramic material comprising alumina or zirconia. In some examples glass melting vessel 14 may be constructed from refractory ceramic bricks. Specific embodiments of glass melting vessel 14 will be described in more detail below.

In some examples, the glass melting furnace may be incorporated as a component of a glass manufacturing apparatus to fabricate a glass substrate, for example a glass ribbon of a continuous length. In some examples, the glass melting furnace of the disclosure may be incorporated as a component of a glass manufacturing apparatus comprising a slot draw apparatus, a float bath apparatus, a down-draw apparatus such as a fusion process, an up-draw apparatus, a press-rolling apparatus, a tube drawing apparatus or any other glass manufacturing apparatus that would benefit from the aspects disclosed herein. By way of example, FIG. 1 schematically illustrates glass melting furnace 12 as a component of a fusion down-draw glass manufacturing apparatus 10 for fusion drawing a glass ribbon for subsequent processing into individual glass sheets.

The glass manufacturing apparatus 10 (e.g., fusion down-draw apparatus 10) can optionally include an upstream glass manufacturing apparatus 16 that is positioned upstream relative to glass melting vessel 14. In some examples, a portion of, or the entire upstream glass manufacturing apparatus 16, may be incorporated as part of the glass melting furnace 12.

As shown in the illustrated example, the upstream glass manufacturing apparatus 16 can include a storage bin 18, a raw material delivery device 20 and a motor 22 connected to the raw material delivery device. Storage bin 18 may be configured to store a quantity of raw materials 24 that can be fed into melting vessel 14 of glass melting furnace 12, as indicated by arrow 26. Raw materials 24 typically comprise one or more glass forming metal oxides and one or more modifying agents. In some examples, raw material delivery device 20 can be powered by motor 22 such that raw material delivery device 20 delivers a predetermined amount of raw materials 24 from the storage bin 18 to melting vessel 14. In further examples, motor 22 can power raw material delivery device 20 to introduce raw materials 24 at a controlled rate based on a level of molten glass sensed downstream from melting vessel 14. Raw materials 24 within melting vessel 14 can thereafter be heated to form molten glass 28.

Glass manufacturing apparatus 10 can also optionally include a downstream glass manufacturing apparatus 30 positioned downstream relative to glass melting furnace 12. In some examples, a portion of downstream glass manufacturing apparatus 30 may be incorporated as part of glass melting furnace 12. In some instances, first connecting conduit 32 discussed below, or other portions of the downstream glass manufacturing apparatus 30, may be incorporated as part of glass melting furnace 12. Elements of the downstream glass manufacturing apparatus, including first connecting conduit 32, may be formed from a precious metal. Suitable precious metals include platinum group metals selected from the group of metals consisting of platinum, iridium, rhodium, osmium, ruthenium and palladium, or alloys thereof. For example, downstream components of the glass manufacturing apparatus may be formed from a platinum-rhodium alloy including from about 70 to about 90% by weight platinum and about 10% to about 30% by weight rhodium. However, other suitable metals can include molybdenum, palladium, rhenium, tantalum, titanium, tungsten and alloys thereof.

Downstream glass manufacturing apparatus 30 can include a first conditioning (i.e., processing) vessel, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may cause molten glass 28 to pass through an interior pathway of first connecting conduit 32 from melting vessel 14 to fining vessel 34. It should be understood, however, that other conditioning vessels may be positioned downstream of melting vessel 14, for example between melting vessel 14 and fining vessel 34. In some embodiments, a conditioning vessel may be employed between the melting vessel and the fining vessel wherein molten glass from a primary melting vessel is further heated to continue the melting process, or cooled to a temperature lower than the temperature of the molten glass in the melting vessel before entering the fining vessel.

Bubbles may be removed from molten glass 28 within fining vessel 34 by various techniques. For example, raw materials 24 may include multivalent compounds (i.e. fining agents) such as tin oxide that, when heated, undergo a chemical reduction reaction and release oxygen. Other suitable fining agents include without limitation arsenic, antimony, iron and cerium. Fining vessel 34 is heated to a temperature greater than the melting vessel temperature, thereby heating the molten glass and the fining agent. Oxygen bubbles produced by the temperature-induced chemical reduction of the fining agent(s) rise through the molten glass within the fining vessel, wherein gases in the molten glass produced in the melting furnace can diffuse or coalesce into the oxygen bubbles produced by the fining agent. The enlarged gas bubbles can then rise to a free surface of the molten glass in the fining vessel and thereafter be vented out of the fining vessel. The oxygen bubbles can further induce mechanical mixing of the molten glass in the fining vessel.

Downstream glass manufacturing apparatus 30 can further include another conditioning vessel such as a mixing vessel 36 for mixing the molten glass. Mixing vessel 36 may be located downstream from the fining vessel 34. Mixing vessel 36 can be used to provide a homogenous glass melt composition, thereby reducing cords of chemical or thermal inhomogeneity that may otherwise exist within the fined molten glass exiting the fining vessel. As shown, fining vessel 34 may be coupled to mixing vessel 36 by way of a second connecting conduit 38. In some examples, molten glass 28 may be gravity fed from the fining vessel 34 to mixing vessel 36 by way of second connecting conduit 38. For instance, gravity may cause molten glass 28 to pass through an interior pathway of second connecting conduit 38 from fining vessel 34 to mixing vessel 36. It should be noted that while mixing vessel 36 is shown downstream of fining vessel 34, mixing vessel 36 may be positioned upstream from fining vessel 34. In some embodiments, downstream glass manufacturing apparatus 30 may include multiple mixing vessels, for example a mixing vessel upstream from fining vessel 34 and a mixing vessel downstream from fining vessel 34. These multiple mixing vessels may be of the same design, or they may be of different designs.

Downstream glass manufacturing apparatus 30 can further include another conditioning vessel such as delivery vessel 40 that may be located downstream from mixing vessel 36. Delivery vessel 40 may condition molten glass 28 to be fed into a downstream forming device. For instance, delivery vessel 40 can act as an accumulator and/or flow controller to adjust and/or provide a consistent flow of molten glass 28 to forming body 42 by way of exit conduit 44. As shown, mixing vessel 36 may be coupled to delivery vessel 40 by way of third connecting conduit 46. In some examples, molten glass 28 may be gravity fed from mixing vessel 36 to delivery vessel 40 by way of third connecting conduit 46. For instance, gravity may drive molten glass 28 through an interior pathway of third connecting conduit 46 from mixing vessel 36 to delivery vessel 40.

Downstream glass manufacturing apparatus 30 can further include forming apparatus 48 comprising the above-referenced forming body 42 and inlet conduit 50. Exit conduit 44 can be positioned to deliver molten glass 28 from delivery vessel 40 to inlet conduit 50 of forming apparatus 48. For example in examples, exit conduit 44 may be nested within and spaced apart from an inner surface of inlet conduit 50, thereby providing a free surface of molten glass positioned between the outer surface of exit conduit 44 and the inner surface of inlet conduit 50. Forming body 42 in a fusion down draw glass making apparatus can comprise a trough 52 positioned in an upper surface of the forming body and converging forming surfaces 54 that converge in a draw direction along a bottom edge 56 of the forming body. Molten glass delivered to the forming body trough via delivery vessel 40, exit conduit 44 and inlet conduit 50 overflows side walls of the trough and descends along the converging forming surfaces 54 as separate flows of molten glass. The separate flows of molten glass join below and along bottom edge 56 to produce a single ribbon of glass 58 that is drawn in a draw direction 60 from bottom edge 56 by applying tension to the glass ribbon, such as by gravity, edge rolls and pulling rolls (not shown), to control the dimensions of the glass ribbon as the glass cools and a viscosity of the glass increases. Accordingly, glass ribbon 58 goes through a visco-elastic transition and acquires mechanical properties that give the glass ribbon 58 stable dimensional characteristics. Glass ribbon 58 may in some embodiments be separated into individual glass sheets 62 by a glass separation apparatus 100 in an elastic region of the glass ribbon. A robot 64 may then transfer the individual glass sheets 62 to a conveyor system using gripping tool 65, whereupon the individual glass sheets may be further processed.

Figure 2:
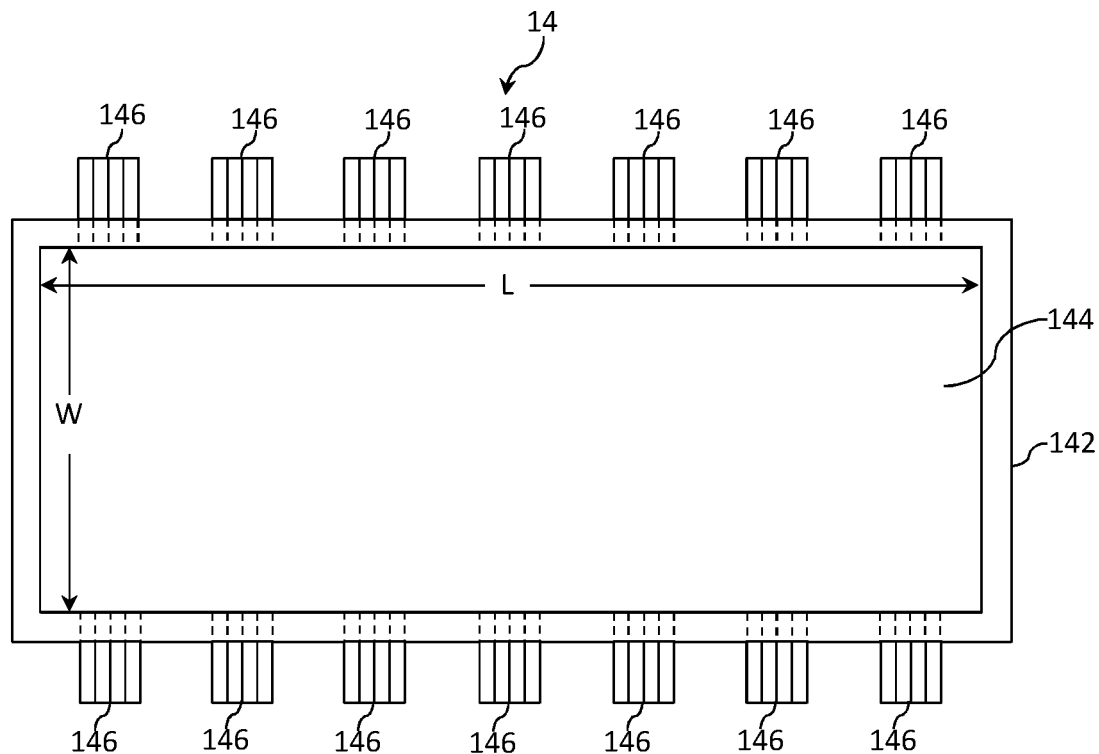
FIG. 2 is a top cutaway view of glass melting vessel according to embodiments disclosed herein.

FIG. 2 is a top cutaway view of glass melting vessel 14 having a sidewall 142 and a floor 144, wherein each of the sidewall 142 and floor 144 comprise a refractory material. Melting vessel has a length (L) and a width (W). Melting vessel 14 also includes a plurality of electrodes 146 extending through the sidewall 142. Specifically, in the embodiment of FIG. 2, melting vessel 14 comprises two opposing sidewalls 142, each opposing sidewall comprising a plurality of electrodes 146 extending there through.

Figure 3:
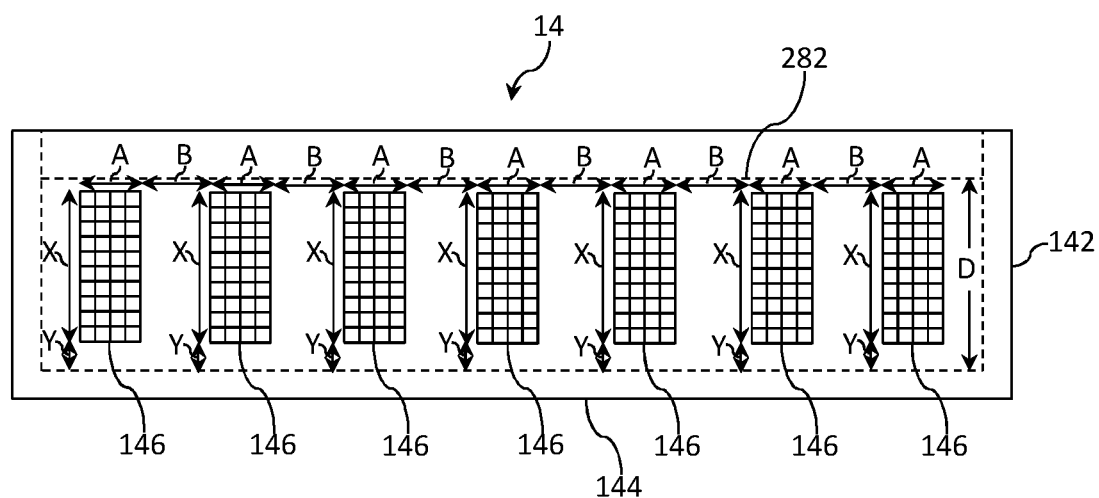
FIG. 3 is a side view of the glass melting vessel of FIG. 2.

FIG. 3 is a side view of the glass melting vessel 14 of FIG. 2, showing sidewall 142, floor 144, and plurality of electrodes 146. Line 282 in FIG. 3 represents a glass melt line, wherein the glass melt depth is indicated by (D). In the embodiment of FIG. 2, each electrode comprises a stack of multiple blocks of electrode material to form a continuous, monolithic electrode body. In the embodiment of FIG. 3, each electrode comprises a single rod of continuous material to form an electrode, the bottom of which may be threaded to add additional electrode material to the bottom enabling the electrode to be pushed into the melt to compensate for electrode wear.

Electrodes 146 may be comprised of any electrically conductive material with refractive properties that also show suitable corrosion resistance to high temperature glass melts. Exemplary electrode materials include, but are not limited to, at least one material selected from the group consisting of tin, molybdenum, platinum, and alloys and oxides of the same.

Sidewall 144 and floor 142 each comprise a refractory material, such as a refractory ceramic brick material, having good corrosion resistance properties relative to high temperature glass melts while, at the same time, having relatively high electrical resistivity. Exemplary refractory materials include alumina and zirconia. In certain exemplary embodiments, sidewall 144 and floor 142 each comprise zirconia, and may consist essentially of zirconia, such as a zirconia material with a relatively high electrical resistivity, such as at least one zirconia material disclosed in U.S. Pat. Nos. 7,687,422, 7,655,587, and U.S. patent publication no. 2008/0076659, the entire disclosures of which are incorporated herein by reference.

Electrodes 146 are connected to power supply (not shown) advantageously with an alternate voltage, which provides a controlled electric current through the glass melt with desired current density distribution, which, according to the Joule Law, $P=I^2R$, where P is the electrical heating power, I is current and R is the resistivity of the glass melt under the melting condition, produce the desired thermal energy to the glass melt. While the embodiment shown in FIGS. 2 and 3 shows a melting vessel 14 comprising a plurality of electrodes 146, wherein joule heating is effected by passing an electrical current through the glass melt supplied by the electrodes 146 in direct contact with a glass melt, it is to be understood that embodiments disclosed herein also include those in which a burning flame of fuel, such as natural gas and the like, is additionally employed to bring the furnace to a high operating temperature where the glass melt is obtained.

In the embodiment of FIGS. 2 and 3, an electrode pushing mechanism (not shown in FIG. 2 or 3) may be employed so as to push at least one of the electrodes 146 to move inwards toward the center of the glass melting vessel 14. In at least one embodiment, each block of electrode material may be connected to a separate and independent electrode pushing mechanism. In at least one embodiment, the electrode pushing mechanism may comprises at least one rod connected directly or indirectly with a rear electrode portion, through which an external pushing force can be exerted to the rear electrode portion. In at least one embodiment, the electrode pushing mechanism may comprise an automated motor adapted for intermittently driving a force applicator connected directly or indirectly with the rear electrode portion. These and other aspects of electrode pushing mechanisms that may be employed in embodiments disclosed herein are described in European Patent Publication No. 2530057, the entire disclosure of which is incorporated herein by reference.

As can be seen from FIGS. 2 and 3, embodiments disclosed herein include those in which a glass melting vessel 14 comprises at least one sidewall 142 and floor 144, wherein the at least one sidewall and floor comprise a refractory material and at least one electrode 146 extends through the at least one sidewall. The at least one electrode 146 is configured to heat a glass melt in contact with the refractory material to an average temperature of at least about 1600° C., such as at least about 1625° C., and further such as at least about 1650° C., and still yet further such as at least about 1675° C., including from about 1600° C. to about 1700° C., for a period of at least about 100 hours, such as a period of at least about 200 hours, and further such as a period of at least about 500 hours, and still yet further such as a period of at least about 1000 hours without exceeding a breakdown condition of the refractory material in contact with the glass melt.

In exemplary embodiments, the applied voltage from the at least one electrode 146 should at least be sufficient to enable heating the glass melt at an average temperature of at least about 1600° C., such as at least about 1625° C., and further such as at least about 1650° C., and still yet further such as at least about 1675° C., including from about 1600° C. to about 1700° C. for a period of at least about 5,000 hours, such as a period of at least about 10,000 hours, and further such as a period of at least about 50,000 hours, and still yet further such as a period of at least about 100,000 hours. Exemplary applied electrode voltages include at least about 200 volts, such as at least about 400 volts, and further such as at least about 600 volts, and yet further such as at least about 800 volts, and still yet further such as at least about 1000 volts, including from about 200 volts to about 1500 volts, such as from about 400 volts to about 1100 volts.

A glass melt will also typically have a "hot spot" temperature that can be defined as the highest temperature reached by the glass melt at a particular spot. A hot spot temperature may be expected to be at least 50° C. higher than the average temperature of the glass melt such that embodiments disclosed herein include those in which the at least one electrode 146 is configured to heat a glass melt in contact with the refractory material at a hot spot temperature of at least about 1650° C., such as at least about 1675° C., and further such as at least about 1700° C., and still yet further such as at least about 1725° C., including from about 1650° C. to about 1750° C., for a period of at least about 5,000 hours, such as a period of at least about 10,000 hours, and further such as a period of at least about 50,000 hours, and still yet further such as a period of at least about 100,000 hours, including from about 5,000 hours to about 200,000 hours, without exceeding a breakdown condition of the refractory material in contact with the glass melt.

In certain exemplary embodiments, the above conditions can be met when the melting vessel has dimensions within a predetermined range. Such conditions can, for example, include those in which the melting vessel has a length (L) and a width (W), as shown, for example, in FIG. 2, and the ratio of the length to the width ranges from about 2.4:1 to about 3.6:1, such as from about 2.6:1 to about 3.4:1, and further such as from about 2.8:1 to 3.2:1, including about 3:1.

In addition, the above conditions can be met when the glass melt has a specified depth relative to the width of the melting vessel. Such conditions can, for example, include those in which the glass melt has a depth (D), as shown, for example, in FIG. 3, and a width (W), as shown, for example, in FIG. 2, and the depth of the glass melt is at least about 50%, such as at least about 55%, and further such as at least about 60%, and yet further such as at least about 65%, and still yet further such as at least about 70% of the width of the melting vessel, such as from about 50% to about 80% of the width of the melting vessel.

In addition, the above conditions can be met when the electrodes have a predetermined configuration with respect to their width and proximity to the next nearest electrode. Such conditions can, for example, include those in which the melting vessel comprises two opposing sidewalls, each opposing sidewall comprising at least two electrodes extending there through, wherein the ratio of the closest distance between electrodes, as shown, for example, as (B) in FIG. 3 and a width of the electrodes in the lengthwise direction of the sidewall as shown, for example, as (A) in FIG. 3, ranges from about 0.8:1 to about 2.4:1, such as from about 1:1 to about 2.2:1, and further such as from about 1.2:1 to about 2:1, including about 1.5:1.

In addition, the above conditions can be met when the electrodes have a predetermined configuration with respect to their length and distance from the floor. Such conditions can, for example, include those in which a vertical distance between the floor and a bottom of each electrode, as shown, for example, as (Y) in FIG. 3, is at least about 5% of a length of each electrode in the vertical direction, as shown, for example, as (X) in FIG. 3, such as at least about 10% of a length of each electrode in the vertical direction, and further such as at least about 15% of a length of each electrode in the vertical direction, including from about 5% to about 20% of a length of each electrode in the vertical direction.

In addition, the above conditions can be met when a specified relationship exists between the volume of the glass melt in the vessel and a distance between the floor and the bottom of each electrode, wherein the volume (V) of the glass melt in the vessel can, for example, be represented by (L)×(W)×(D) as shown in FIGS. 2 and 3, and the vertical distance between the floor and the bottom of each electrode can be shown, for example, as (Y) in FIG. 3, such as when $(V)/(Y)^3$ is less than about 60,000, such as less than about 40,000, and further such as less than about 20,000, and yet further such as less than about 10,000, such as from about 1,000 to about 10,000, including from about 2,000 to about 8,000, and further including from about 3,000 to about 6,000.

While the embodiments of FIGS. 2 and 3 show a melting vessel 14 comprising two opposing sidewalls 142, each opposing sidewall 142 comprising seven electrodes 146 extending there through, it is to be understood that embodiments disclosed herein may include those in which two opposing sidewalls each contain any number of electrodes, such as at least one electrode, at least two electrodes, at least three electrodes, and so forth, in each opposing sidewall, including from 1 to 100 electrodes, such as from 2 to 50 electrodes, and further such as from 5 to 20 electrodes in each opposing sidewall. For example, each opposing sidewall may have N electrodes each having a width of (A) as shown, for example, in FIG. 3, wherein the closest distance between electrodes, as shown, for example, as (B) in FIG. 3 satisfies the relationship described above and N×A is at least about 30%, such as at least about 35%, and further such as at least about 40%, and still yet further such as at least about 45%, including from about 30% to about 50% of the length (L) of the melting vessel as shown, for example, in FIG. 2.

Figure 4:
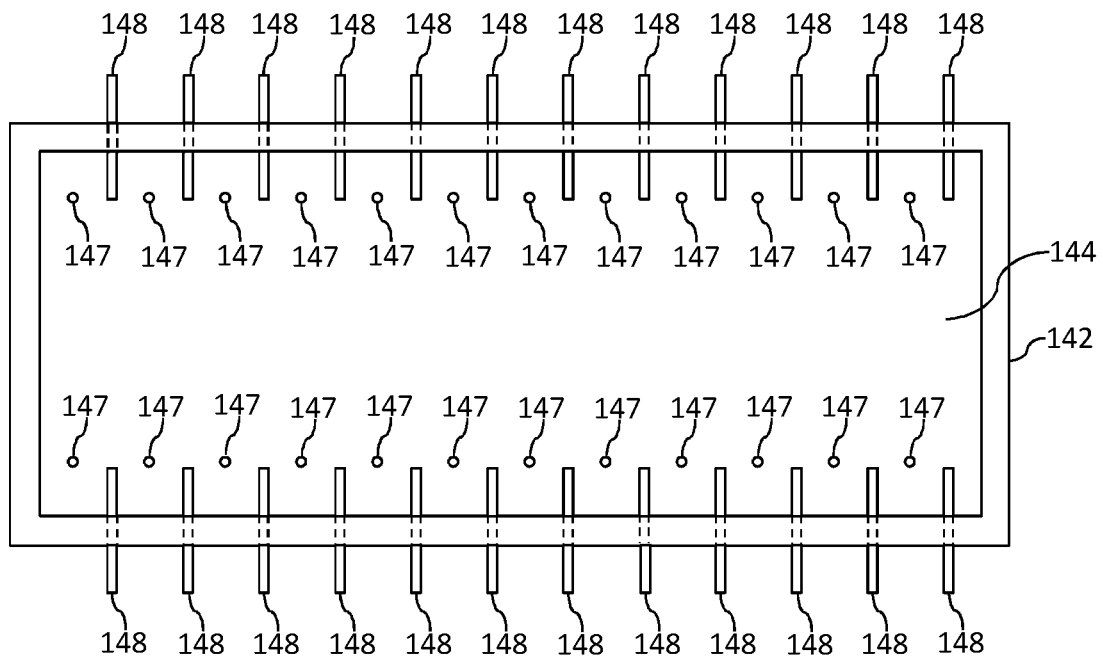
FIG. 4 is a top cutaway view of a glass melting vessel according to embodiments disclosed herein.
Figure 5:
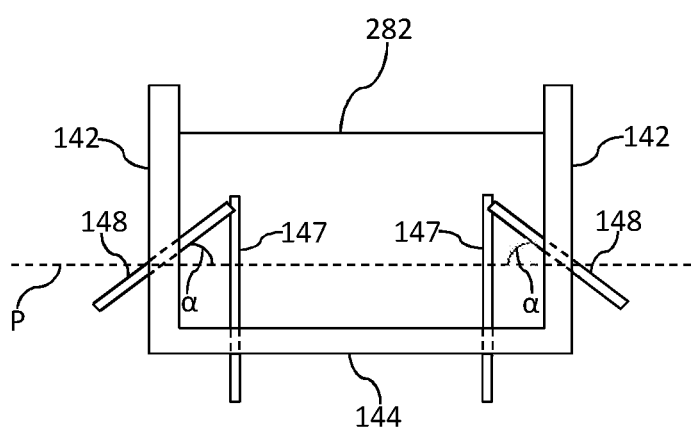
FIG. 5 is an end cutaway view of the glass melting vessel of FIG. 4.

FIGS. 4 and 5 illustrate top cutaway and end cutaways views respectively, of an alternative embodiment of a melting vessel 14 comprising a plurality of electrodes, wherein a first set of electrodes 148 extend through a sidewall 142 of the melting vessel 14 and a second set of electrodes 147 extending through the floor 144 of the melting vessel 14. In the embodiment illustrated in FIGS. 4 and 5, each electrode comprises an elongated body that extends a predetermined distance into an interior chamber of the melting vessel 14. In addition, the second set of electrodes extend from a position on the floor 144 that is a predetermined distance away from the at least one sidewall 142.

As can be seen from FIG. 5, each of first set of electrodes 148 extends at an angle (a) relative to a plane (P) parallel to the floor 144. Angle (a) may, for example, range from about 0 degrees to about 75 degrees, such as from about 10 degrees to about 60 degrees, and further such as from about 20 degrees to about 45 degrees.

While the cross-sectional geometry of electrodes 147 and/or 148 is not limited, in certain exemplary embodiments electrodes 147 and/or 148 may have a substantially cylindrical shape with a substantially circular or elliptical cross-section. Other cross sections, such as square, rectangular, and triangular are also possible. The diameter of electrodes 147 and/or 148, while not limited, may, for example, range from about 1 to 5 inches, such as from about 2 to 4 inches, including about 3 inches. As with the embodiment described in reference to FIGS. 2 and 3, electrodes 147 and/or 148 may be comprised of any electrically conductive material with refractive properties that also show suitable corrosion resistance to high temperature glass melts. Exemplary electrode materials include, but are not limited to, at least one material selected from the group consisting of tin, molybdenum, platinum, and alloys and oxides of the same.

In certain exemplary embodiments, the second set of electrodes 147 can extend upward from a position on the floor at least about 60%, such as at least about 65%, and further such as at least about 70%, including from about 60% to about 75% of the depth of the glass melt. Such electrodes may also, for example, extend a distance away from the closest sidewall that is at least about 5%, such as at least about 10%, and further such as at least about 15%, such as from about 5% to about 20% of the width of the melting vessel 142.

While in the embodiment illustrated in FIG. 5, the portion of electrodes 147 and 148 that extend the farthest into the glass melt are at about the same approximate height in the glass melt and at about the same approximate distance from the nearest sidewall, it is to be understood that embodiments disclosed herein are not so limited and also include those in which the portion of electrodes 147 that extend the farthest into the glass melt may be at a higher or lower height in the glass melt and/or closer or farther distance from the nearest sidewall as compared to the portion of electrodes 148 that extend the farthest into the glass melt. It is to be further understood, that, in certain embodiments, individual electrodes 147 may be of differing heights, diameters, and/or distances from the nearest sidewall. In addition, in certain embodiments, individual electrodes 148 may extend different distances into the glass melt, extend at different angles relative to a plane parallel to the floor 144, and/or have different diameters.

While the embodiments of FIGS. 4 and 5 show a melting vessel 14 comprising two opposing sidewalls 142, each opposing sidewall 142 comprising twelve electrodes 148 extending there through and a floor 144 comprising twenty four electrodes 147 extending there through in an alternating arrangement relative to electrodes 148 it is to be understood that embodiments disclosed herein may include other arrangements, including those in which two opposing sidewalls and floor each have any number of electrodes extending there through, such as at least one electrode, at least two electrodes, at least three electrodes, and so forth, extending through each opposing sidewall and/or floor, including from 1 to 100 electrodes extending through each opposing sidewall and/or floor, such as from 2 to 50 electrodes, and further such as from 5 to 20 electrodes extending through each opposing sidewall and/or floor. For example, each opposing sidewall and/or floor may have N electrodes extending there through, wherein the closest distance between electrodes ranges from, for example, about 1% to about 20%, such as from about 2% to about 15%, and further such as about 3% to about 10%, and yet further such as about 4% to about 8%, including about 5% of the length of the melting vessel.

Embodiments disclosed herein may be used with a variety of glass compositions, including those having relatively higher or lower electrical resistivities. Such compositions may, for example, include a glass composition, such as an alkali free glass composition comprising 58-65 wt % $SiO_2$, 14-20 wt % $Al_2O_3$, 8-12 wt % $B_2O_3$, 1-3 wt % MgO, 5-10 wt % CaO, and 0.5-2 wt % SrO. Such compositions may also include a glass composition, such as an alkali free glass composition, comprising 58-65 wt % $SiO_2$, 16-22 wt % $Al_2O_3$, 1-5 wt % $B_2O_3$, 1-4 wt % MgO, 2-6 wt % CaO, 1-4 wt % SrO, and 5-10 wt % BaO. Such compositions may further include a glass composition, such as an alkali free glass composition, comprising 57-61 wt % $SiO_2$, 17-21 wt % $Al_2O_3$, 5-8 wt % $B_2O_3$, 1-5 wt % MgO, 3-9 wt % CaO, 0-6 wt % SrO, and 0-7 wt % BaO. Such compositions may additionally include a glass composition, such as an alkali containing glass composition, comprising 55-72 wt % $SiO_2$, 12-24 wt % $Al_2O_3$, 10-18 wt % $Na_2O$, 0-10 wt % $B_2O_3$, 0-5 wt % $K_2O$, 0-5 wt % MgO, and 0-5 wt % CaO, which, in certain embodiments, may also include 1-5 wt % $K_2O$ and 1-5 wt % MgO.

Embodiments disclosed herein can be used in the production of glass articles, such as glass sheets used in electronic devices, including electronic devices with high resolution displays, such as televisions, tablets, and smart phones.

By configuring electrodes and melting vessel geometries according to embodiments disclosed herein, a glass melt can be heated at an average temperature of at least about 1600° C. without exceeding a breakdown condition of the refractory material in contact with the glass melt. In this regard, modeling experiments conducted by applicants have suggested that at glass and refractory temperatures of at least about 1600° C., such when the glass comprises any of the above compositions and the refractory comprises zirconia, configuration of the electrodes and melting vessel geometry substantially affects the amount of power generated within the refractory material at the glass melt interface relative to the power generated within the glass melt. While, for certain high temperature melt operations, sufficient electrode power must enable the glass melt to reach an average temperature of at least about 1600° C., such power has previously been expected to exceed the breakdown condition in the refractory material at the glass melt interface, especially for time periods exceeding 5,000 hours. Embodiments disclosed herein, including the electrode configurations and melting vessel geometries disclosed herein, provide a solution to this problem and can reduce the amount of power generated within the refractory by at least 30% relative to alternative configurations and geometries. Embodiments disclosed herein can also enable more flexible melt system operation, wherein different glass compositions having different electrical resistivities and different temperature regimes can be utilized without the need to change the melt system configuration.

It will be apparent to those skilled in the art that various modifications and variations can be made to embodiment of the present disclosure without departing from the spirit and scope of the disclosure. Thus it is intended that the present disclosure cover such modifications and variations provided they come within the scope of the appended claims and their equivalents.

What is claimed is:

1. A glass melt delivery system vessel comprising:
   at least one sidewall and floor, wherein the at least one sidewall and floor comprise a refractory material;
   at least one electrode extending through the refractory material;
   wherein the at least one electrode is configured to heat a glass melt in contact with the refractory material at an average temperature of at least about 1600° C. without exceeding a breakdown condition of the refractory material in contact with the glass melt;
   wherein the melting vessel has a length and a width and the ratio of the length to the width ranges from about 2.4:1 to about 3.6:1 and wherein the melting vessel is configured to accept a glass melt having a depth of at least about 50% of the width of the melting vessel.

2. The glass melt delivery system vessel of claim 1, wherein the refractory material comprises zirconia.

3. The glass melt delivery system vessel of claim 1, wherein the vessel is configured to heat the glass melt in contact with the refractory material to an average temperature of at least about 1600° C. for a period of at least about 5,000 hours.

4. The glass melt delivery system vessel of claim 1, wherein the melting vessel is configured to accept the glass melt having the depth of at least about 70% of the width of the melting vessel.

5. The glass melt delivery system vessel of claim 1, wherein the melting vessel comprises two opposing sidewalls, each opposing sidewall comprising at least two electrodes extending there through, wherein the ratio of the closest distance between electrodes and a width of the electrodes in the lengthwise direction of the sidewall ranges from about 0.8:1 to about 2.4:1.

6. The glass melt delivery system vessel of claim 1, wherein a volume of the glass melt in the vessel (V) and a vertical distance (Y) between the floor and the bottom of the at least one electrode satisfies the relationship $(V)/(Y)^3 < 60,000$.

7. The glass melt delivery system vessel of claim 1, wherein the at least one electrode comprises an elongated body that extends a predetermined distance into an interior chamber of the melting vessel.

8. The glass melt delivery system vessel of claim 7, wherein the at least one electrode extends at an angle ranging from about 0 degrees to about 75 degrees relative to a plane parallel to the floor.

9. The glass melt delivery system vessel of claim 7, wherein the melting vessel comprises at least one electrode comprising an elongated body that extends a predetermined distance into the interior chamber of the melting vessel from a position on the floor that is a predetermined distance away from the at least one sidewall.

10. The glass melt delivery system vessel of claim 1, wherein the at least one electrode comprises at least one material selected from the group consisting of tin, molybdenum, platinum, and alloys and oxides of the same.

11. A method of making a glass article, the method comprising processing a glass composition in a glass melt delivery system vessel, the glass melt delivery system vessel comprising:
at least one sidewall and floor, wherein the at least one sidewall and floor comprise a refractory material;
at least one electrode extending through the refractory material;
wherein the at least one electrode heats a glass melt in contact with the refractory material at an average temperature of at least about 1600° C. without exceeding a breakdown condition of the refractory material in contact with the glass melt;
wherein the melting vessel comprises two opposing sidewalls, each opposing sidewall comprising at least two electrodes extending therethrough, wherein the ratio of the closest distance between the electrodes and a width of the electrodes in the lengthwise direction of the sidewall ranges from about 0.8:1 to about 2.4:1, and wherein a vertical distance between the floor and a bottom of one of the electrodes is at least about 5% of a length of the electrode in a vertical direction.

12. The method of claim 11, wherein the refractory material comprises zirconia.

13. The method of claim 11, wherein the glass melt in contact with the refractory material is heated to an average temperature of at least about 1600° C. for a period of at least about 5,000 hours.

14. The method of claim 11, wherein the melting vessel has a length and a width and the ratio of the length to the width ranges from about 2.4:1 to about 3.6:1.

15. The method of claim 14, wherein the glass melt has a depth of at least about 50% of the width of the melting vessel.

16. The method of claim 14, wherein each opposing sidewall comprises N electrodes that each comprise a width of A such that N times A is from about 30% to about 50% of the length of the melting vessel.

17. The method of claim 11, wherein a volume of the glass melt in the vessel (V) and a vertical distance (Y) between the floor and the bottom of the at least one electrode satisfies the relationship $(V)/(Y)^3 < 60,000$.

18. The method of claim 11, wherein the at least one electrode comprises an elongated body that extends a predetermined distance into an interior chamber of the melting vessel.

19. The method of claim 18, wherein the at least one electrode extends at an angle ranging from about 0 degrees to about 75 degrees relative to a plane parallel to the floor.

20. The method of claim 18, wherein the melting vessel comprises at least one electrode comprising an elongated body that extends a predetermined distance into the interior chamber of the melting vessel from a position on the floor that is a predetermined distance away from the at least one sidewall.

21. The method of claim 11, wherein the at least one electrode comprises at least one material selected from the group consisting of tin, molybdenum, platinum, and alloys and oxides of the same.

22. A glass article made by a method comprising processing a glass composition in a glass melt delivery system vessel, the glass melt delivery system vessel comprising:
at least one sidewall and floor, wherein the at least one sidewall and floor comprise a refractory material;
at least one electrode extending through the refractory material;
wherein the at least one electrode heats a glass melt in contact with the refractory material at an average temperature of at least about 1600° C. without exceeding a breakdown condition of the refractory material in contact with the glass melt;
wherein the melting vessel comprises the two opposing sidewalls, each opposing sidewall comprising at least two electrodes extending therethrough, wherein a ratio of the closest distance between the electrodes and a width of the electrodes in a lengthwise direction of the sidewall ranges from about 0.8:1 to about 2.4:1, and wherein a vertical distance between the floor and a bottom of the one of the electrodes is at least about 5% of a length of the electrode in the vertical direction.

23. The glass article of claim 22, wherein the glass article is a glass sheet.

24. An electronic device comprising a glass article made by a method comprising processing a glass composition in a glass melt delivery system vessel, the glass melt delivery system vessel comprising:
at least one sidewall and floor, wherein the at least one sidewall and floor comprise a refractory material;
at least one electrode extending through the refractory material;
wherein the at least one electrode heats a glass melt in contact with the refractory material at an average temperature of at least about 1600° C. without exceeding a breakdown condition of the refractory material in contact with the glass melt:
wherein the melting vessel comprises the two opposing sidewalls, each opposing sidewall comprising at least two electrodes extending therethrough, wherein a ratio of the closest distance between the electrodes and a width of the electrodes in a lengthwise direction of the sidewall ranges from about 0.8:1 to about 2.4:1, and wherein a vertical distance between the floor and a bottom of the one of the electrodes is at least about 5% of a length of the electrode in the vertical direction, wherein the glass article is the glass sheet.

* * * * *

UNITED STATES PATENT AND TRADEMARK OFFICE
CERTIFICATE OF CORRECTION

PATENT NO. : 11,028,001 B2  
APPLICATION NO. : 16/348142  
DATED : June 8, 2021  
INVENTOR(S) : Gilbert De Angelis et al.

Page 1 of 1

It is certified that error appears in the above-identified patent and that said Letters Patent is hereby corrected as shown below:

On the Title Page

In Column 2, item (57), Abstract, Line 6, delete "1600 C°" and insert -- 1600° C --, therefor.

In the Claims

In Column 14, Line 49, Claim 24, delete "melt:" and insert -- melt; --, therefor.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*